(12) United States Patent
Fedosovsky et al.

(10) Patent No.: US 9,520,756 B2
(45) Date of Patent: Dec. 13, 2016

(54) LINEAR ELECTROMECHANICAL ACTUATOR

(71) Applicant: Joint stock company "Diakont", Saint Petersburg (RU)

(72) Inventors: Mikhail Evgenievich Fedosovsky, Saint Petersburg (RU); Vadim Igorevich Dunaev, Saint Petersburg (RU); Evgeny Valerievich Mysov, Saint Petersburg (RU)

(73) Assignee: Joint stock company Diakont, Saint Petersburg (RU)

( * ) Notice: Subject to any disclaimer, the term of this patent is extended or adjusted under 35 U.S.C. 154(b) by 0 days.

(21) Appl. No.: 14/724,144

(22) Filed: May 28, 2015

(65) Prior Publication Data

US 2015/0263587 A1    Sep. 17, 2015

(30) Foreign Application Priority Data

May 8, 2015   (EA) .................... 201500563

(51) Int. Cl.
| | |
|---|---|
| *H02K 7/06* | (2006.01) |
| *H02K 33/16* | (2006.01) |
| *H02K 7/08* | (2006.01) |
| *F16H 25/20* | (2006.01) |
| *F16H 25/22* | (2006.01) |

(52) U.S. Cl.
CPC ............ *H02K 7/06* (2013.01); *H02K 7/083* (2013.01); *H02K 11/21* (2016.01); *H02K 33/16* (2013.01); *F16H 25/2015* (2013.01); *F16H 25/2252* (2013.01); *F16H 2025/204* (2013.01); *F16H 2025/2075* (2013.01)

(58) Field of Classification Search
CPC ....... H02K 7/06; H02K 33/16; F16H 25/2015; F16H 25/2252; F16H 2025/204; F16H 2025/2075
USPC ........ 310/12, 14, 68 B, 90, 20; 74/89, 89.34
See application file for complete search history.

(56) References Cited

U.S. PATENT DOCUMENTS

| | | | |
|---|---|---|---|
| 3,021,730 A | 2/1962 | Banker et al. | |
| RE32,222 E * | 8/1986 | Drutchas | B62D 5/0427 180/444 |
| 5,491,372 A * | 2/1996 | Erhart | F04B 7/00 310/80 |
| 6,084,326 A * | 7/2000 | Nagai | F16H 25/2418 310/103 |

(Continued)

FOREIGN PATENT DOCUMENTS

| | | |
|---|---|---|
| DE | 102009009395 A1 | 8/2010 |
| DE | 102012105709 A1 | 4/2014 |

(Continued)

Primary Examiner — John K Kim
(74) Attorney, Agent, or Firm — Frommer Lawrence & Haug LLP

(57) ABSTRACT

The present invention relates to an electromechanical actuator comprising a housing, an electric motor, a roller drive and a rotor rotation angle sensing unit received in said housing. The rotor of the electromechanical actuator is mounted within the housing and configured to rotate in bearing supports. Openings for supplying and removing lubricant are arranged in the housing in the vicinity of the bearing supports, the opening allowing to replace lubricant without disassembling the actuator, thus simplifying maintenance and operation.

8 Claims, 3 Drawing Sheets

(56) References Cited

U.S. PATENT DOCUMENTS

| | | | |
|---|---|---|---|
| 8,601,952 B2* | 12/2013 | Tamai | B61F 5/245 |
| | | | 105/171 |
| 2005/0155444 A1 | 7/2005 | Otaki et al. | |
| 2006/0101929 A1 | 5/2006 | Benoit et al. | |
| 2008/0297010 A1* | 12/2008 | Yoshimura | H02K 29/12 |
| | | | 310/68 B |
| 2010/0084230 A1 | 4/2010 | Yamasaki et al. | |
| 2013/0112104 A1* | 5/2013 | Tamai | B61F 5/245 |
| | | | 105/199.2 |
| 2015/0263587 A1* | 9/2015 | Fedosovsky | H02K 7/06 |
| | | | 310/68 B |

FOREIGN PATENT DOCUMENTS

| | | |
|---|---|---|
| EP | 2685609 A1 | 1/2014 |
| WO | 2005096472 A1 | 10/2005 |

\* cited by examiner

LINEAR ELECTROMECHANICAL ACTUATOR

FIELD OF THE INVENTION

The present invention relates to linear actuators, in particular to a linear electromechanical actuator comprising a roller drive.

DESCRIPTION OF THE RELATED ART

Linear electromechanical actuators comprising a roller drive are known to utilize for controlling various machines and mechanisms. U.S. Pat. No. 5,491,372 (Erhart) discloses a bidirectional electrically powered linear actuator comprising a housing assembly, an electric motor and a roller drive, wherein said electric motor and said roller drive are received within the housing to engage with each other. The roller drive comprises a threaded cylinder, threaded rollers and an output shaft. The electric motor comprises a stator and a rotor, wherein the rotor of the electric motor comprises said threaded cylinder of the roller drive. The electric motor involves bidirectional linear movement of the output shaft. The working surfaces of the known actuator are lubricated by applying a lubricant to said surfaces during actuator assembly. In order to replace spent lubricant with fresh lubricant, the actuator need to be disassembled and the output shaft with threaded rollers need to be removed from the housing, which requires dismantling the actuator and leads to a lengthy downtime.

It is a general object of the present invention to simplify the process of replacing lubricant in a linear electromechanical actuator, to reduce downtime of such actuator and to simplify usage thereof.

SUMMARY OF THE INVENTION

The object is achieved by a linear electromechanical actuator comprising a housing, an electric motor comprising a stator fixed to the inner surface of the housing, and a rotor rotatably mounted within the housing, a roller drive comprising a threaded cylinder having inner thread, the cylinder being rotatably mounted within the housing on a bearing support, an output shaft having a threaded portion, the output shaft being slidably mounted within said cylinder, and threaded rollers mounted within said threaded cylinder to engage with the inner thread of the threaded cylinder and the threaded portion of the output shaft, wherein the rollers are further configured to transfer force from said threaded cylinder to the output shaft, wherein the rotor of the electric motor is formed by fixing magnets to the outer surface of the roller drive threaded cylinder, and wherein the housing is provided with at least one closeable opening for supplying lubricant into the internal space of the threaded cylinder and to said bearing support, and at least one closeable opening for removing said lubricant from the bearing support and from the internal space of the threaded cylinder.

Advantageously, the closeable openings for supplying and removing lubricant allow lubricating actuator parts without disassembling the actuator, thus simplifying maintenance and providing more efficient operation of the linear electromechanical actuator.

BRIEF DESCRIPTION OF THE DRAWINGS

Detailed description of the embodiments of the present invention is provided below with reference to accompanying drawings, wherein.

DESCRIPTION OF THE PREFERRED EMBODIMENTS

Figure 1:
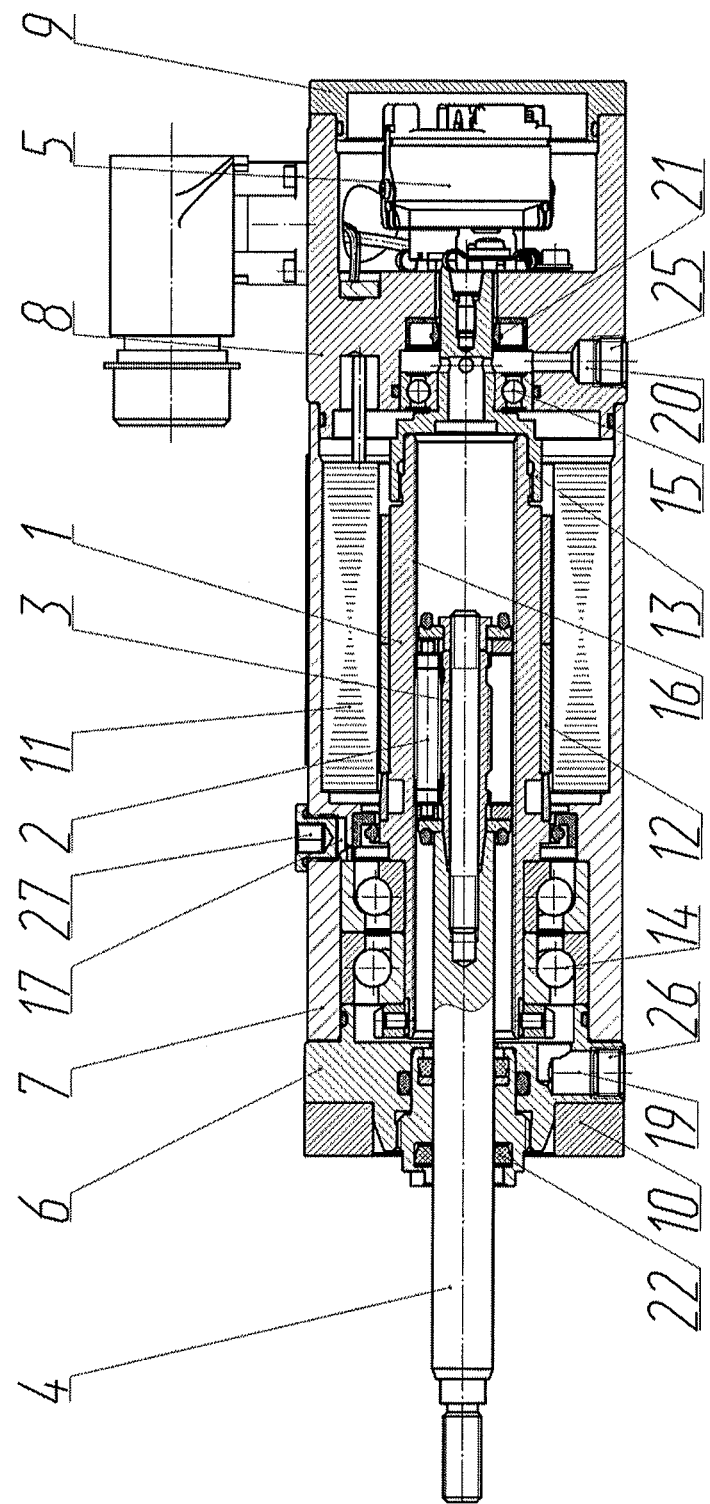
FIG. 1 is a cross-sectional view of the electromechanical actuator according to the preferred embodiment.

According to one of the preferred embodiments shown in FIG. 1, the disclosed electromechanical actuator generally comprises a housing assembly, an electric motor and a roller drive, wherein the motor and the drive are arranged in the housing assembly to engage with each other.

The roller drive comprises an internally threaded cylinder (nut) 1, the nut being rotatably mounted in the housing assembly and having internal thread 16, the roller drive further comprises threaded rollers 2, a threaded portion (screw) 3 and an output shaft (rod) 4 having a roller drive rod seal 22, wherein screw 3 and rod 4 are mounted coaxially with the nut 1. Screw 3 is connected to the rod 4 so that said parts are prevented from relative movement. The rollers 2 are evenly spaced along the circumference of the screw 3 and contact the internal thread of the nut 1.

The length of the internal thread 16 defines the travel of the screw 3. The screw 3 has a threaded portion with length approximately equal to the length of the rollers 2. Rollers 2 are arranged on the screw 3 so that linear movement thereof along the screw axis is prevented, while planetary movement of the rollers 2 by rolling along threads of the screw 3 and the nut 1 is enabled. Rotation of the nut 1 enables linear movement of the rollers 2 and the screw 3 with respect to the nut 1, and therefore reciprocating movement of the rod 4, the output member of the electromechanical actuator, is provided.

The linear actuator further comprises a rotation angle sensing unit 5, wherein the unit 5 comprises a shaft 13 connected to the nut 1 for conjoint rotation therewith. The shaft 13 is cylindrical hollow shaft mounted on the nut 1 so that the internal space of the nut 1 communicates with the internal space of the shaft 13. The shaft 13 has at least one through radial channel 23.

The electric motor comprises an electric motor stator 11 and an electric motor rotor. Permanent magnets 12 of the electric motor rotor are fixed to the nut 1 and evenly distributed along the circumference thereof, and therefore the electric motor rotor is formed by the nut 1 and the shaft 13 of the sensing unit 5 coupled to the nut 1. The rotor is rotatably mounted in the stator 11 on a first bearing support 15 formed by a sealed radial bearing, and on a second bearing support 14 comprising two radial-thrust bearings. The bearing of the support 15 is mounted on the shaft 13, while bearings of the support 14 are mounted on the nut 1. The bearing support 14 allows transferring axial load from the nut 1 to the housing assembly.

As noted above, the electric motor and the roller drive of the inventive actuator are housed in the housing assembly. The housing assembly comprises a flange 6, a stator housing 7, a rotation angle sensing unit housing 8, and caps 9, 10. Said parts 7, 8, 9, 10 of the housing assembly are coupled by means of threaded connection. Caps 9, 10 can be configured to connect with other external parts or units, and for that purpose they can be provided, e.g. with openings or protrusions, the caps 9, 10 further may be equipped with additional sealing elements to separate the internal space of the housing assembly from the external environment.

According to one of the preferred embodiments, the housing 8 comprises a sealed enclosure receiving the sensing unit 5. The enclosure is sealed by a lip seal 21 mounted on the shaft 13 protruding from the enclosure to engage with the nut 1 as disclosed above. Similarly, the housing 7 comprises a sealed enclosure receiving electric parts of the electric motor, i.e. stator 11 and magnets 12 of the rotor. The enclosure is sealed by a lip seal 18 mounted on the nut 1. The enclosures are further separated from one another by a sealing ring 24 mounted in the housing 8 in abutment to the bearing 15.

Figure 2:
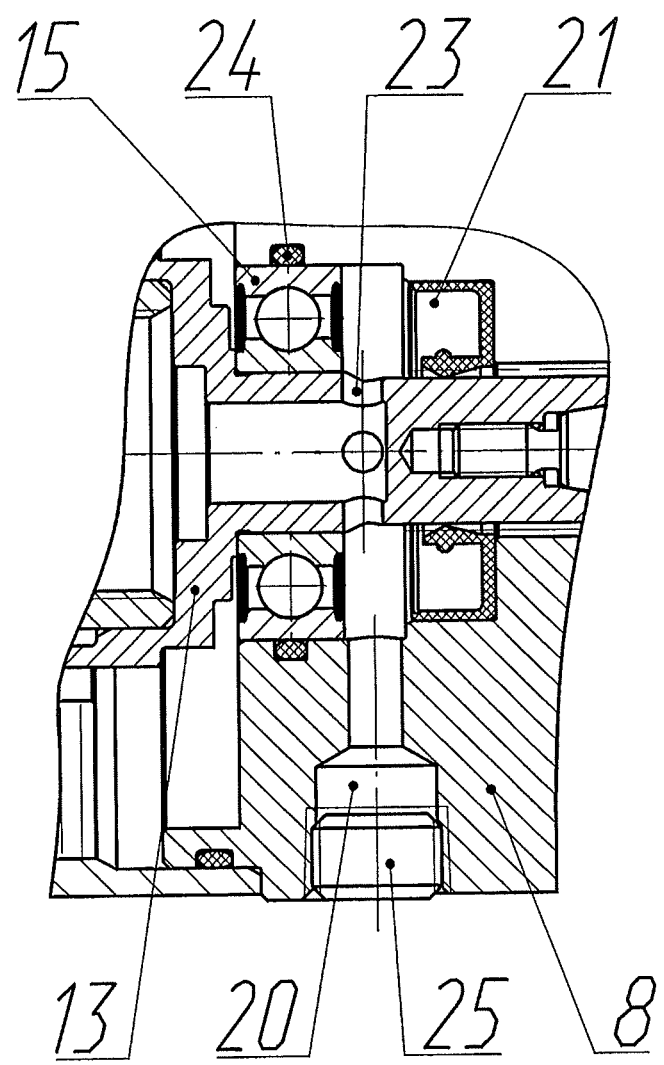
FIG. 2 is a detail view of an opening for supplying lubricant into the electromechanical actuator.
Figure 3:
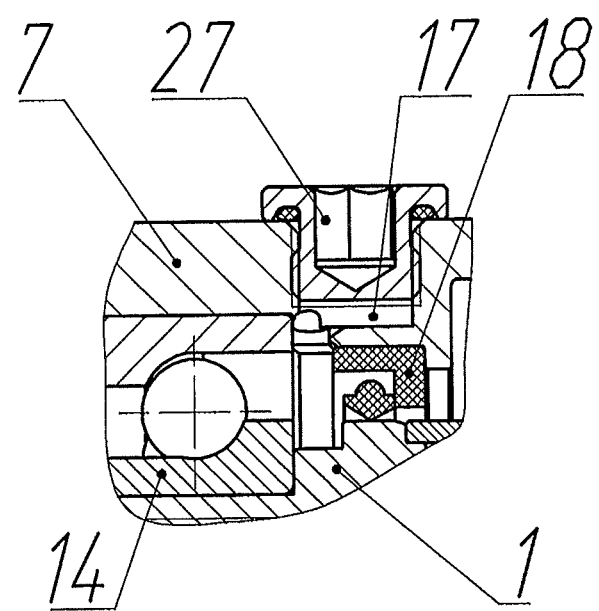
FIG. 3 is a detail view of another opening for supplying lubricant into the electromechanical actuator.

In operation, the bearings of the support 14 and roller drive parts 1, 2, 3 need to be lubricated. According to the invention said parts are lubricated without disassembling and dismantling the actuator, by supplying lubricant into the relevant enclosures of the linear actuator via corresponding openings shown in FIGS. 2 and 3. The lubricant is preferably one of the commercially available plastic lubricants.

According to one of the preferred embodiments, the housing 8 comprises closable opening 20 for supplying lubricant to roller drive parts 1, 2, 3. As can be seen on FIG. 2, the opening 20 may be formed in the housing 8 radially to provide a channel allowing the lubricant to pass from the outside of the housing 8 to the through radial channel 23 in the shaft 13 of the unit 5. The opening 20 protrudes to the radial channel 23 of the shaft 13 to communicate therewith, thus allowing lubricant to further flow into the internal space of the shaft 13. The channel formed by the opening 20 is separated from the enclosure receiving the sensing unit 5 by the lip seal 21 and separated from the enclosure receiving the electric motor parts by the sealing ring 24 mounted in the housing 8. The lubricant, once supplied, flows through the opening 20 into the internal space of the shaft 13 through the radial channel 23 and further into the internal space of the nut 1 to lubricate the roller drive parts, wherein the lubricant is prevented from flowing to the sensing unit 5 and stator 11 of the motor by the sealing elements. The opening 20 is provided with thread so that the opening 20 can be closed with a threaded sealing plug 25 or threaded tube for supplying lubricant may be attached to the opening 20.

According to one of the preferred embodiments, the housing 7 has additional closable opening 17 for supplying lubricant to radial-thrust bearings of the support 14, the opening being made in the housing 7 wall. As mentioned above, the bearing support 14 is separated from the enclosure housing the stator 11 by the lip seal 18. As can be seen on FIG. 3, the opening 17 may be made above the lip seal 18 to reduce the linear dimension of the actuator. The lip seal 18 abuts a circumferential baffle, wherein the baffle has an annular groove in the vicinity of the bearing support 14 to provide communication of the support 14 with the opening 17. The opening 17 is provided with thread so that it can be closed with a threaded sealing plug 27 or threaded tube for supplying lubricant may be attached to the opening 17.

In order to remove spent lubricant from the linear actuator, closable opening 19 (not shown in FIGS. 2 and 3) is used. According to one of the preferred embodiments, the opening 19 is made in the flange 6. The opening 19 forms a draining channel for removing spent lubricant from the actuator, the opening 19 communicates with the bearing support 14 and with the internal space of the nut 1 to allow removing (draining) spent lubricant from the actuator. The opening 19 is provided with thread so that it can be closed with a threaded sealing plug 26 or threaded tube for removing lubricant may be attached to the opening 19.

According to one of the preferred embodiments, the inventive linear electromechanical actuator operates as follows. When electrical current is supplied to the stator 11, a rotating electrical field of the stator is generated, causing rotation of the rotor with permanent magnets 12. The rotation of the rotor (nut 1) causes rotation of threaded rollers 2 and progressive movement thereof along with the screw 3 with respect to the nut 1. Said progressive movement causes progressive movement of the rod 4, the output member of the linear actuator. In operation, openings 17, 19 and 20 are closed with sealed plugs.

Before replacement of lubrication the linear actuator is turned off. Further, access to openings 17 and 20 for supplying lubricant and to opening 19 for removing lubricant is provided by unscrewing corresponding plugs. Then lubricant is supplied into the corresponding openings 17 and 20. The lubricant supplied through the opening 20 flows towards the shaft 13 of the unit 5 along corresponding channel and, passing through radial channel 23 in shaft 13, enters the internal space of the nut 1. The lip seal 21 prevents the lubricant from entering the enclosure housing the sensing unit 5, while the sealing ring 24 mounted in the housing 8 prevents the lubricant from entering the enclosure housing the stator 11. Further, the lubricant flows through parts 1, 2, 3 of the roller lubricating them. The lubricant supplied through the opening 17 flows towards the bearings of the support 14, wherein the lip seal 18 prevents the lubricant from entering the enclosure housing the stator 11. The lubricant supplied into openings 17 and 20 flows towards the opening 19. Lubricant replacement is achieved by forced supplying lubricant into the corresponding openings to force out spent lubricant, and does not require dismantling and disassembly of the linear actuator. The lubricant may comprise any plastic lubricant or liquid lubricant suitable for use in linear electromechanical actuators of the described type.

According to another preferred embodiment, the lubrication may flow both through the roller drive parts and through the electric motor parts to lubricate and cool them. For that purpose the sealing ring 24 on the bearing 15 and the lip seal 18 may be omitted from the actuator.

According to still another preferred embodiment the rotor of the electric part may have only one bearing support 14, while the additional support of the rotor during rotation thereof is provided by magnetic field of the stator 11.

According to yet another preferred embodiment, the shaft 13 of the sensing unit as well as unit 5 itself may be omitted so that the lubricant supplied to the opening 20 flows towards the open end of the nut 1 to enter internal space thereof.

According to yet another preferred embodiment, the opening 17 may be omitted. The bearing support 14 may be lubricated by a lubricant flowing from the internal space of the nut 1 to the opening 19.

It should also be mentioned, that replacement of the lubricant may be provided during operation of the actuator. For that purpose threaded tubes for supplying lubricant are connected to the openings 17, 20 and threaded tube for draining the lubricant is connected to the opening 19. This is especially suitable for liquid lubricants used both for lubrication and cooling the working surfaces. The lubricant is supplied and drained through the tubes during operation of the actuator. The centrifugal force generated by rotation of the rotor shifts the lubricant supplied to the nut 1 via opening 20 and the channel of the shaft 13 to the periphery of the nut 1 and, thus, assists in proper lubrication of the working surfaces, i.e. particularly the threaded portions of the nut 1, rollers 2 and screw 3.

It is to be understood that the present invention is not limited by the disclosed embodiments of the actuator, which may be combined with each other or implemented separately. It is apparent for those skilled in the art that another embodiments and modification of the disclosed invention are possible without departing from the spirit of the invention or the scope of the appended claims.

REFERENCE NUMERALS IN THE FIGURES

1. Internally threaded cylinder (nut)
2. Threaded roller
3. Threaded portion (screw)
4. Output shaft (rod)
5. Rotor rotation angle sensing unit
6. Flange
7. Stator housing
8. Rotor rotation angle sensing unit housing
9. Cap
10. Cap
11. Electric motor stator
12 Permanent magnets of electric motor rotor
13. Rotor rotation angle sensing unit shaft
14. Second bearing support
15. First bearing support
16. Internal thread
17. Closable opening
18. Lip seal
19. Closable opening
20. Closable opening
21. Lip seal
22. Roller drive rod seal
23. Through radial channel
24. Sealing ring
25. Threaded sealing plug
26. Threaded sealing plug
27. Threaded sealing plug

The invention claimed is:

1. A linear electromechanical actuator comprising:
a housing,
an electric motor comprising a stator fixed to an inner surface of the housing, and a rotor, the rotor being rotatably mounted within the housing on at least one bearing support;
a roller drive comprising
an internally threaded cylinder having an inner space,
an output shaft comprising a threaded portion and slidably mounted within said cylinder, and
threaded rollers mounted within said cylinder to engage between the inner thread of the cylinder and the threaded portion of the output shaft, wherein
the rotor of the electric motor is formed by fixing magnets to the outer surface of the roller drive cylinder, and
wherein the housing is provided with
at least one closeable opening for supplying lubricant into the internal space of said internally threaded cylinder and to said at least one bearing support, and
at least one closeable opening for draining the lubricant from said at least one bearing support and from the internal space of said internally threaded cylinder,
and threaded sealing plugs configured to be mounted in said closeable openings in order to close them.

2. A linear electromechanical actuator comprising:
a housing,
an electric motor comprising a stator fixed to an inner surface of the housing, and a rotor, the rotor being rotatably mounted within the housing on first bearing support and second bearing support;
a roller drive comprising
an internally threaded cylinder having an inner space,
an output shaft comprising a threaded portion and slidably mounted within said cylinder, and
threaded rollers mounted within said cylinder to engage between the inner thread of the cylinder and the threaded portion of the output shaft, wherein
the rotor of the electric motor is formed by fixing magnets to the outer surface of the roller drive cylinder,
wherein the actuator housing is provided with
a closeable opening for supplying lubricant into the internal space of said threaded cylinder,
a closable opening for supplying lubricant to said second bearing support, and
a closeable opening for draining the lubricant from said second bearing supports and from the internal space of said threaded cylinder,
wherein said first bearing support comprises a sealed radial bearing,
wherein an enclosure of the housing receiving the electric motor is sealed by a lip seal mounted on the internally threaded cylinder and by a sealing ring mounted on the sealed radial bearing, and
the actuator further comprising a rotor rotation angle sensing unit mounted within the housing and comprising a shaft of the sensing unit, the shaft being hollow cylindrical shaft and having at least one through radial channel, wherein the at least one through radial channel is adapted to communicate with the closeable opening for supplying lubricant into the internal space of said threaded cylinder and to said first bearing support.

3. The actuator according to claim 2, wherein said second bearing support comprises two adjacent radial-thrust bearings.

4. The actuator according to claim 2, wherein the rotor of the electric motor is formed by the internally threaded cylinder fixedly connected to the shaft of the sensing unit so that the inner space of the shaft communicates with the inner space of the threaded cylinder.

5. The actuator according to claim 4, wherein the first bearing support of the rotor is mounted on the shaft of the sensing unit, while the second bearing support of the rotor is mounted on the internally threaded cylinder.

6. The actuator according to claim 2, further comprising a lip seal mounted on the shaft of the sensing unit to seal an enclosure of the housing receiving the sensing unit.

7. The actuator according to claim 2, wherein said closeable openings are provided with thread.

8. The actuator according to claim 2, further comprising threaded sealing plugs configured to be mounted in said closeable openings in order to close them.

* * * * *